US006523855B2

United States Patent
Musiol et al.

(10) Patent No.: US 6,523,855 B2
(45) Date of Patent: Feb. 25, 2003

(54) AIR BAG, METHOD OF MANUFACTURE AND SYSTEM THEREFOR

(75) Inventors: John A. Musiol, Waterford, MI (US); Paul R. Weber, Birmingham, MI (US); Tony B. Popovski, Macomb, MI (US); James R. Athon, Dothan, AL (US)

(73) Assignee: Breed Automotive Technologies, Inc., Lakeland, FL (US)

( * ) Notice: Subject to any disclaimer, the term of this patent is extended or adjusted under 35 U.S.C. 154(b) by 0 days.

(21) Appl. No.: 09/406,271

(22) Filed: Sep. 24, 1999

(65) Prior Publication Data

US 2002/0005638 A1 Jan. 17, 2002

(51) Int. Cl.$^7$ ............................................. B60R 21/24
(52) U.S. Cl. ..................... 280/729; 280/732; 280/742
(58) Field of Search .......................... 280/728.1, 729, 280/742, 731, 732, 743.1, 743.2

(56) References Cited

U.S. PATENT DOCUMENTS

| | | | |
|---|---|---|---|
| 3,642,303 A | | 2/1972 | Irish et al. |
| 4,300,894 A | * | 11/1981 | Cumming et al. .......... 280/729 |
| 5,129,675 A | * | 7/1992 | Wang |
| 5,174,599 A | * | 12/1992 | Hull et al. ................... 280/731 |
| 5,240,283 A | * | 8/1993 | Kishi et al. ................. 280/729 |
| 5,306,043 A | * | 4/1994 | Mihm et al. ................ 280/732 |
| 5,358,273 A | * | 10/1994 | Onishi et al. ............... 280/731 |
| 5,683,109 A | * | 11/1997 | Birman ....................... 280/742 |
| 5,791,685 A | * | 8/1998 | Lachat et al. ............. 280/743.1 |
| 5,853,191 A | * | 12/1998 | Lachat ........................ 280/729 |
| 5,906,391 A | * | 5/1999 | Weir et al. .................. 280/729 |
| 5,957,485 A | * | 9/1999 | Hirai ........................ 280/743.1 |
| 6,059,310 A | * | 5/2000 | Buss ........................... 280/729 |
| 6,059,311 A | * | 5/2000 | Wipasuramonton et al. ..... 280/729 |
| 6,059,312 A | * | 5/2000 | Staub et al. ................ 280/729 |
| 6,089,599 A | * | 7/2000 | Schimmoller et al. ... 280/743.1 |
| 6,129,382 A | * | 10/2000 | Tonooka .................. 280/743.1 |

FOREIGN PATENT DOCUMENTS

| | | |
|---|---|---|
| DE | 196 45 401 A1 | 5/1998 |
| EP | 0 593 172 A1 | 4/1994 |
| EP | 0 801 045 A1 | 10/1997 |
| EP | 0 876 943 A2 | 11/1998 |

OTHER PUBLICATIONS

Federal Register/vol. 63, No. 181/Friday, Sep. 18, 1998/Proposed Rules.

* cited by examiner

Primary Examiner—Brian L. Johnson
Assistant Examiner—Christopher Bottorff
(74) Attorney, Agent, or Firm—Markell Seitzman

(57) ABSTRACT

A partitioned air bag (55) comprising an upper (54) and a lower (52) inflatable chamber, the lower chamber upon inflation is positioned to provide a cushioned boundary generally against the lower chest and abdomen of an occupant to be protected, the lower chamber first receiving inflation gas from a source of inflation wherein the inflation gas is sequentially transferred to the upper chamber through one or more ports (162) formed by a separator panel that separates the air bag into the upper and lower chambers. The air bag is inflated by a single stage air bag inflator (26) characterized as having a relatively low fill rate.

16 Claims, 14 Drawing Sheets

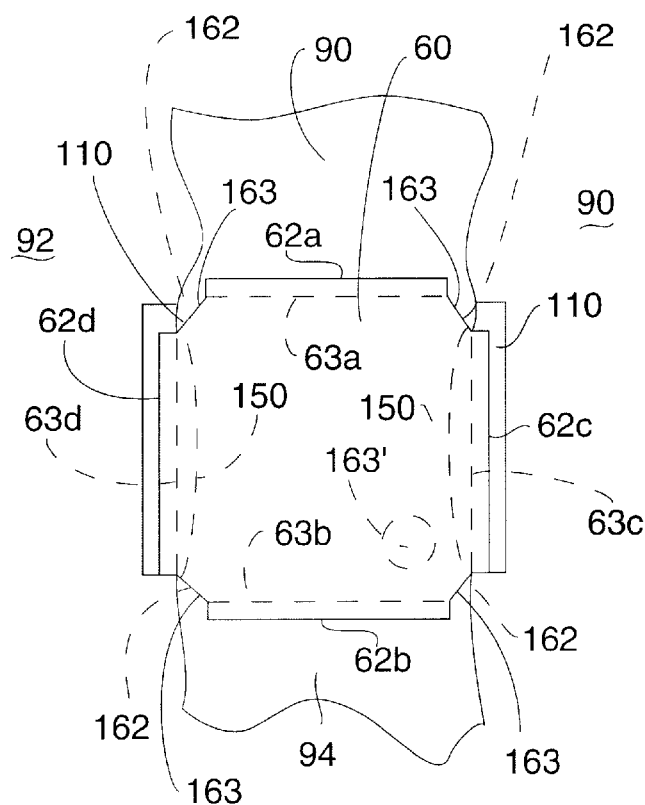
Fig. 7
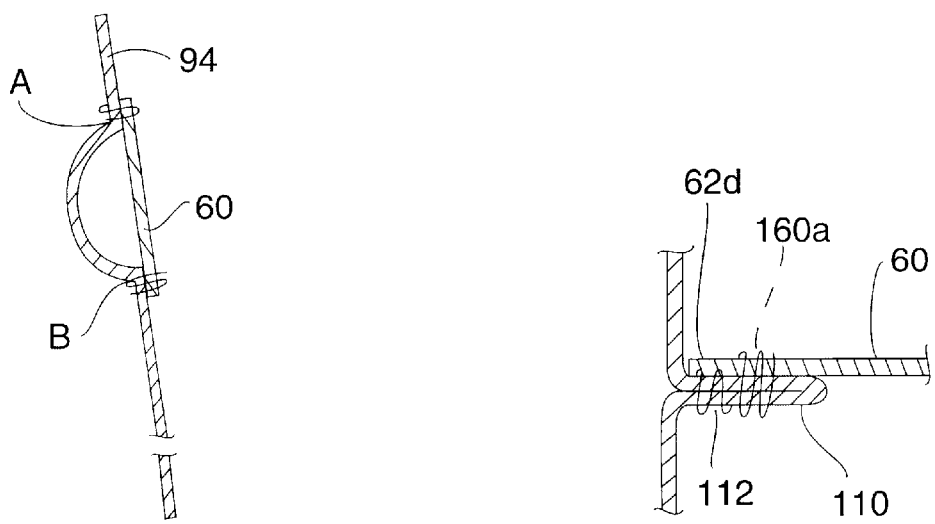
Fig. 6      Fig. 8

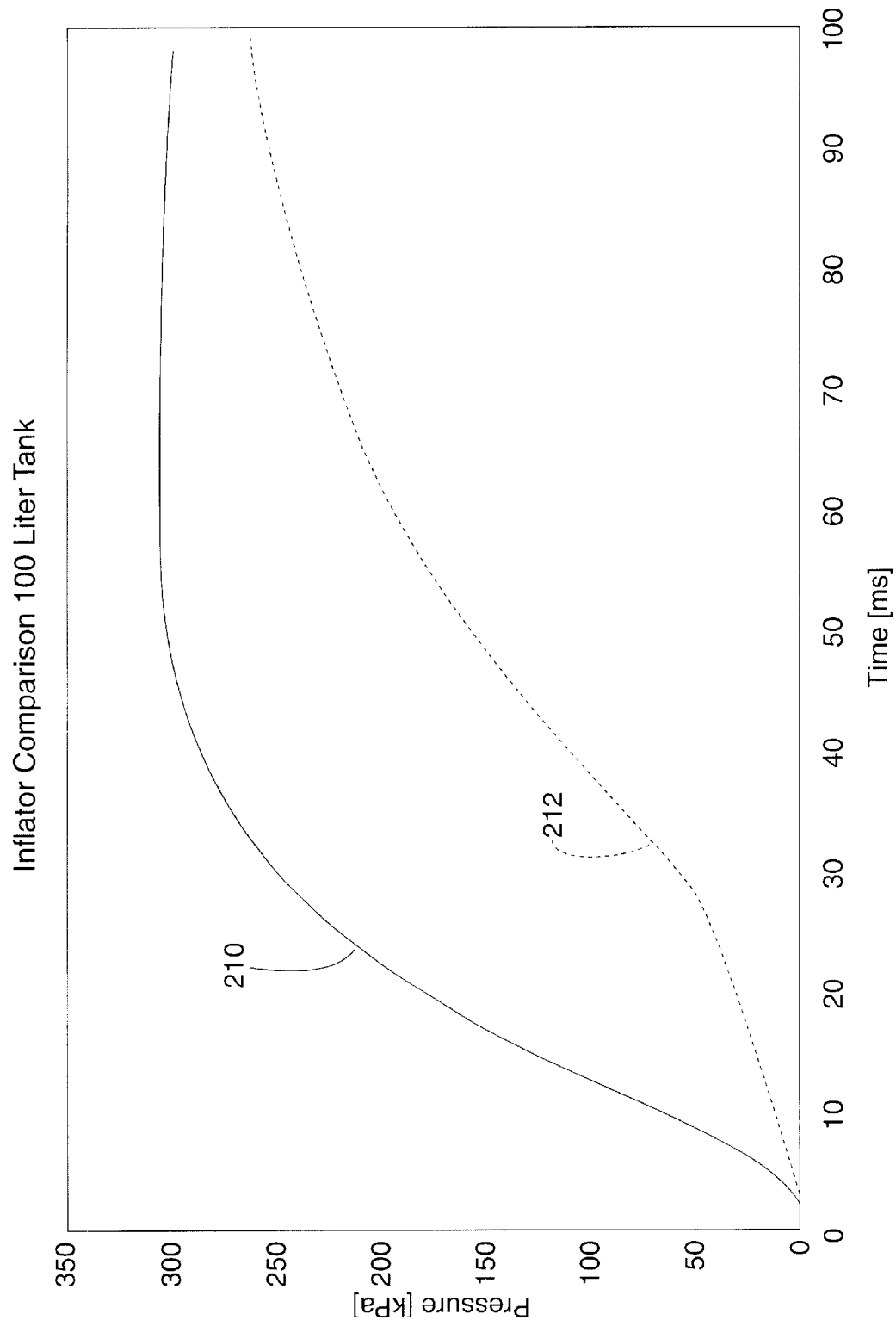

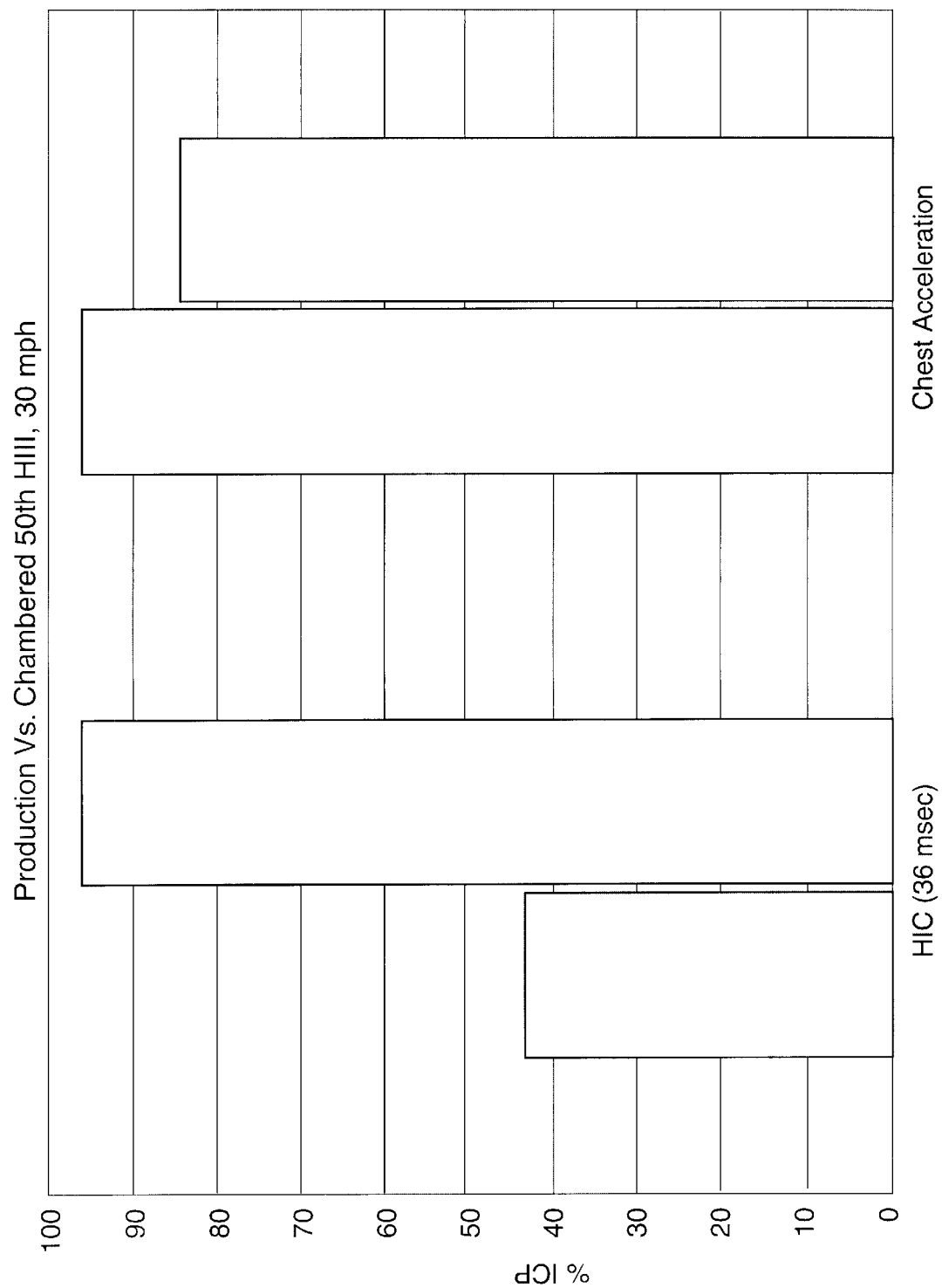

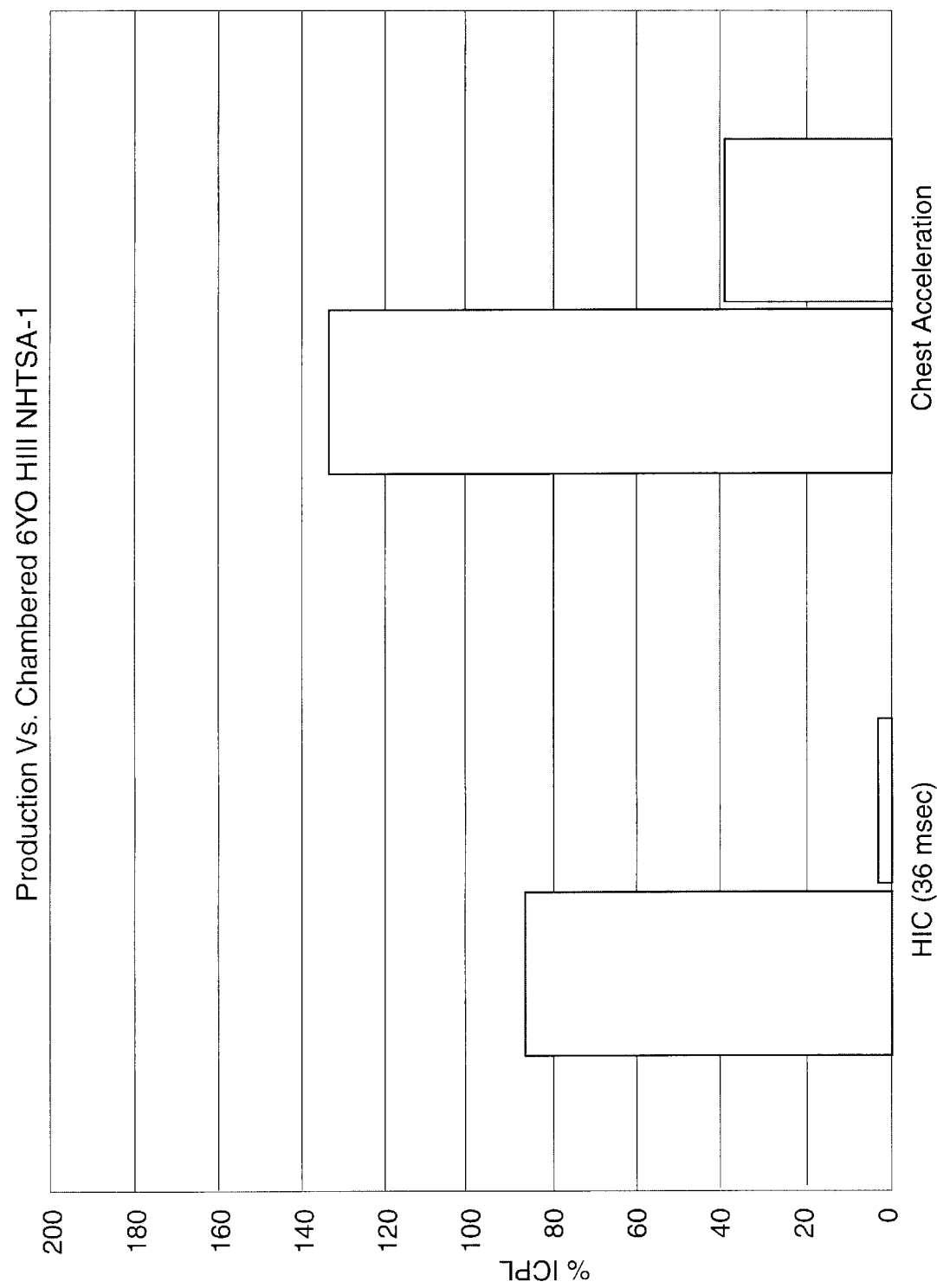

AIR BAG, METHOD OF MANUFACTURE AND SYSTEM THEREFOR

BACKGROUND AND SUMMARY OF THE INVENTION

The present invention generally relates to automotive safety restraint devices and more particularly to air bags and systems.

The range of sizes of front seat passengers of a typical automobile varies from a relatively small infant in a child seat, to a small child to a large (male) adult. This range in occupant size makes the design of an effective occupant protection system extremely difficult, as a single system must operate within a changing environment. Typically, the air bag must inflate very quickly so that it is sufficiently inflated to protect an average sized adult occupant who is not wearing his or her seat belt, as defined by the current Federal Motor Vehicle Safety Standards (FMVSS) 208, while also operate in a manner so as not to injure the child or small-sized adult that might be improperly seated. Safety literature, as well as prior patents, has also addressed the need for designing safety systems that adequately protect the improperly seated child or adult. This improperly seated occupant is typically referred to as an out-of-position occupant, or alternatively, that the occupant is in an out-of-position orientation. Interestingly, the current Federal safety standards do not address system performance criteria in relation to the out-of-position child even though manufacturers have addressed this issue. The National Highway Traffic Safety Administration (see Federal Register, Vol. 63, No. 181, Sep. 18, 1998), which is incorporated herein by reference, has proposed new rules which include performance criteria for the out-of-position occupant such as a child, who is partially seated on the vehicle seat, with a portion of its anatomy lying upon or closely spaced from the air bag deployment location, typically the location of the air bag's deployment door (see for example FIG. 12).

The proposed rulemaking proposes the addition of several new tests, including tests for various sized occupants that are positioned properly in the vehicle environment as well as in an out-of-position orientation.

Consider a rudimentary air bag system such as a passenger side air bag system. This system typically includes an inflator or gas generator capable of generating inflation gas at one determinable rate, an air bag and an optional deployment cover. The size of the air bag will vary with its application. As an example, the air bag may be of sufficient size to protect only the right outboard, front seated occupant and, in some applications, large enough to also protect an occupant in the middle front seating position. In order to protect the larger sized occupant, the inflator must be sized to generate gas at a sufficient rate to cause the air bag to burst through the deployment door and to inflate within a relatively few milliseconds to provide a cushioned barrier for the adult-sized, unbelted occupant. As can be appreciated, this type of aggressively positioned and inflated air bag may not be optimally suited for the out-of-position child or small adult. Various individuals have proposed systems which can accommodate each size of occupant including systems that automatically or manually deactivate the passenger side air bag or otherwise change the performance characteristics of the system, in particular the inflator, in proportion to the size and position of the occupant. For example, such systems would be deactivated when a child or alternatively, an infant seat, is present in the front or facing passenger seating position. The deactivation of the air bag may be done manually or through a complicated array of position sensors and associated software algorithms which determine the size and location of the occupant. As can be appreciated, these approaches have their drawbacks in that a manually deactivated system may not be subsequently reactivated or, alternatively, the active occupant sensing system is relatively expensive. Other solutions to the above problem propose utilizing a multi-stage air bag inflator in which the air bag is inflated at a low inflation rate, in the presence of a child, out-of-position occupant, child seat or small adult, and inflated at a higher rate in other conditions.

The present invention provides a unique and simple solution to the design of an air bag and air bag system capable of protecting the wide range of vehicle occupants of different sizes in a severe crash.

It is an object of the present invention to provide an improved air bag system comprising a multi-chambered air bag activated by a single stage inflator, however multi-stage inflators can also be used.

It is a further object of the present invention to provide protection to normally seated occupants while minimizing the risk of injury to out-of-position occupants, in particular, children.

SUMMARY OF THE INVENTION

Accordingly the invention comprises: a partitioned air bag comprising an upper and a lower inflatable chamber, the lower chamber upon inflation is positioned to provide a cushioned boundary generally against the lower chest and abdomen of a seated adult occupant to be protected, the lower chamber first receiving inflation gas from a source of inflation wherein the inflation gas is sequentially transferred to the upper chamber through one or more ports or passages formed by or in a separator panel. The separator panel separates the air bag into the upper and lower chambers. The source of inflation is preferably a single stage air bag inflator characterized as having a relatively low fill rate.

Many other objects and purposes of the invention will be clear from the following detailed description of the drawings.

BRIEF DESCRIPTION OF THE DRAWINGS

In the drawings:

FIG. 6 is a side view showing the separator panel attached to the main panel.

FIG. 7 is a front view showing a portion of a sewn air bag in an inside-out configuration.

FIG. 8 shows the attachment of the separator panel to pleats formed on each of the side panels.

FIG. 11 shows inflator pressure-time curves.

FIGS. 13 and 14 present data achieved during testing of the present invention.

DETAILED DESCRIPTION OF THE DRAWINGS

Figure 1:
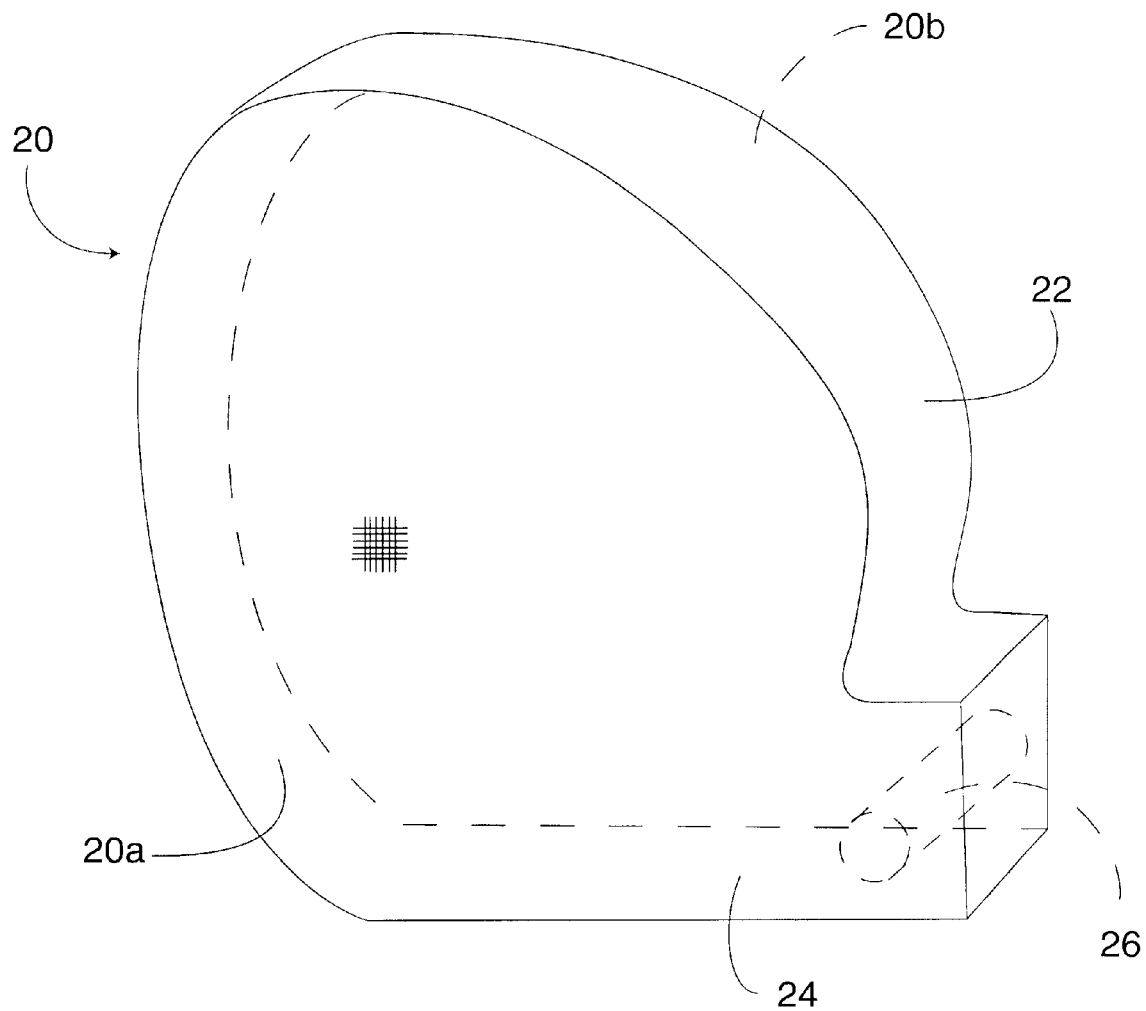
FIG. 1 illustrates a prior art air bag.

Reference is briefly made to FIG. 1 which diagrammatically illustrates a prior art passenger side air bag 20. The air bag includes a first and second side panel 20a and 20b and center or main panel 22. The side panels 20a and 20b are sewn or otherwise attached to the main panel 22. The panels are typically made of a woven nylon material that may be coated, partially coated or uncoated using material such as silicone and urethane. The completed air bag includes a neck portion 24 which is attached to an air bag inflator 26 (or to an associated housing) and defines a single inflated volume or chamber. The size of any particular passenger air bag varies with its application. The typical size of a passenger air bag used in the North America is in the vicinity of about 120 cubic liters and might be as small as 90 cubic liters and as large as 160 cubic liters or more. While not illustrated in FIG. 1, the air bag 20 may be designed to protect only the outboard seated front passenger or, alternatively, both a middle seated occupant and the outboard seated occupant. For ease of illustration, the side panels are shown in a vertical orientation. As can be appreciated, when the air bag 20 is inflated the side panels are pushed outwardly to give the air bag a more spherical shape.

Figure 2:
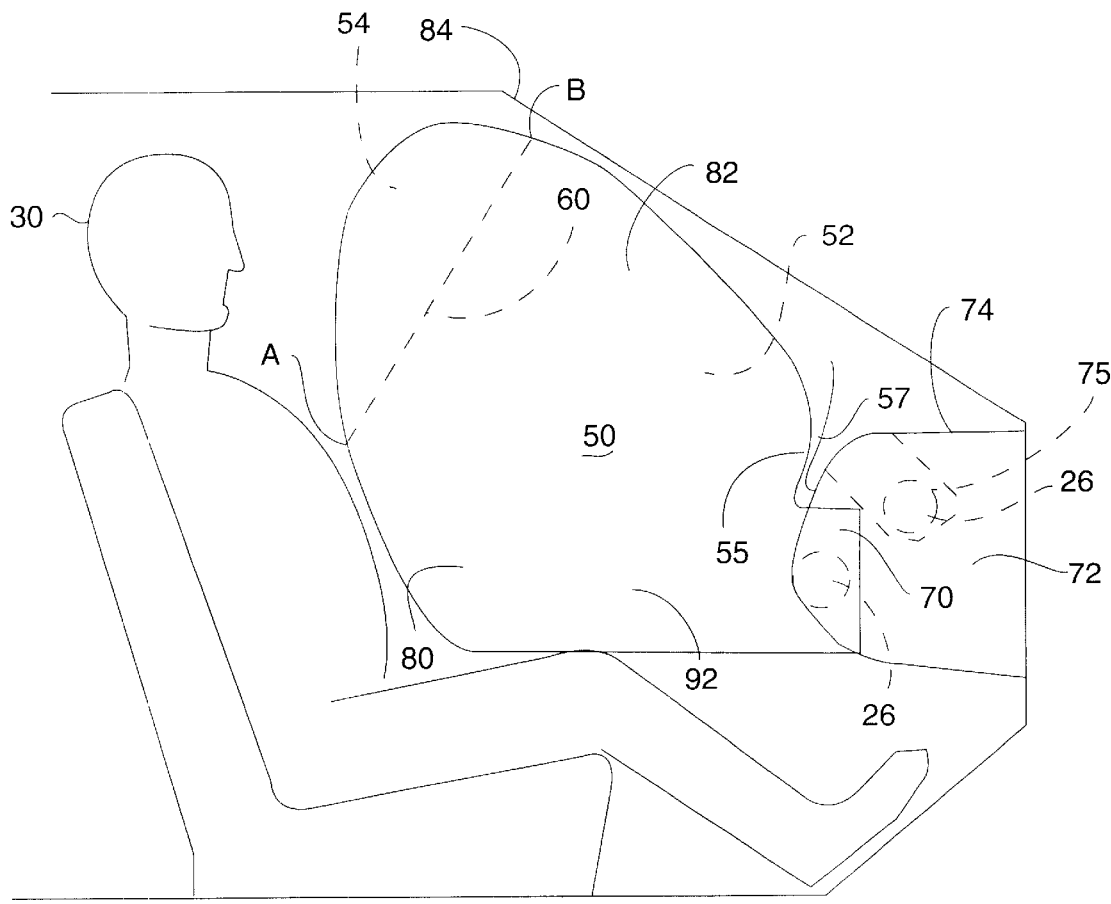
FIG. 2 shows an inflating air bag, of the present invention, within a vehicle passenger compartment.

To illustrate the benefits of the present invention, the air bag 50 shown in FIG. 2 was designed to have generally the same exterior size and shape as that of air bag 20. However, air bag 50 also includes a separator panel 60 which divides the internal volume of the air bag 50 into a large or primary 52 chamber and smaller or secondary 54 chamber. In the present invention, the ratio of the volume of the primary chamber to the secondary chamber may vary from about 60/40 or 70/30 to 95/25 or 85/15. In the air bag for which test results are later presented, the volume of the primary chamber was approximately 95 liters and the volume of the secondary chamber was approximately 25 liters to maintain the total volume at about 120 liters. The separator panel 60, as also discussed below, is oriented at a bias or angle relative to the side panels of air bag 50, as well as to the occupant, such that the secondary chamber 54 is positioned generally in the top, forward portion or quadrant of the air bag 50 to provide protection for the upper chest and head of the occupant 30. The angle of the separator panel is preferably about 18 degrees from the vertical and might vary to about 30 degrees. As used herein, a forward portion of the air bag is that portion of the air bag designed to interact with and protect the chest and head of the occupant.

One use of the air bag 50 is as part of a part of a mid-mount air bag system. In a mid-mount configuration, the air bag, in its pre-activated, folded configuration, is situated generally adjacent a vertical face 70 of an instrument panel or dashboard 72. Upon deployment, the air bag is initially propelled horizontally from its stored configuration. The present invention is also usable in a three-quarter-mount configuration, shown in dotted line 75, which has the air bag (and any associated housing) mounted slightly higher and on an angle in the instrument panel. Upon deployment, the air bag (in the three-quarter configuration) initially expands upward toward the windshield 84. These mid-mount or three-quarter-mount configurations are in contrast to a top-mounted air bag, that is, one designed to deploy the air bag through an opening or deployment door located generally on the top 74 of the instrument panel 72. It is anticipated, however, that the present air bag will also improve performance in the top-mount configurations.

During deployment, the air bag 50 is inflated forwardly such that the lower forward portion 80 of the air bag 50 is positioned to interfere with the seated adult occupant's abdomen or lower chest and the upper rear portion 82 impacts and reacts against the windshield 84 of the vehicle and the lower rear portion of the airbag 55 impacts and reacts against the instrument panel and in some cases against the open deployment door 57. (FIG. 2 also shows the door 57 in a post-deployment configuration.) As described in greater detail below, the air bag 50 includes an outboard side panel 90, an inboard side panel 92 and a main panel 94 (also shown in FIGS. 3 and 5). The main panel is sewn about the periphery of each side panel 90 and 92 to complete the exterior structure or form of the air bag 50. The above-mentioned separator panel 60 is sewn to the main panel 94 and side panels.

Figure 3:
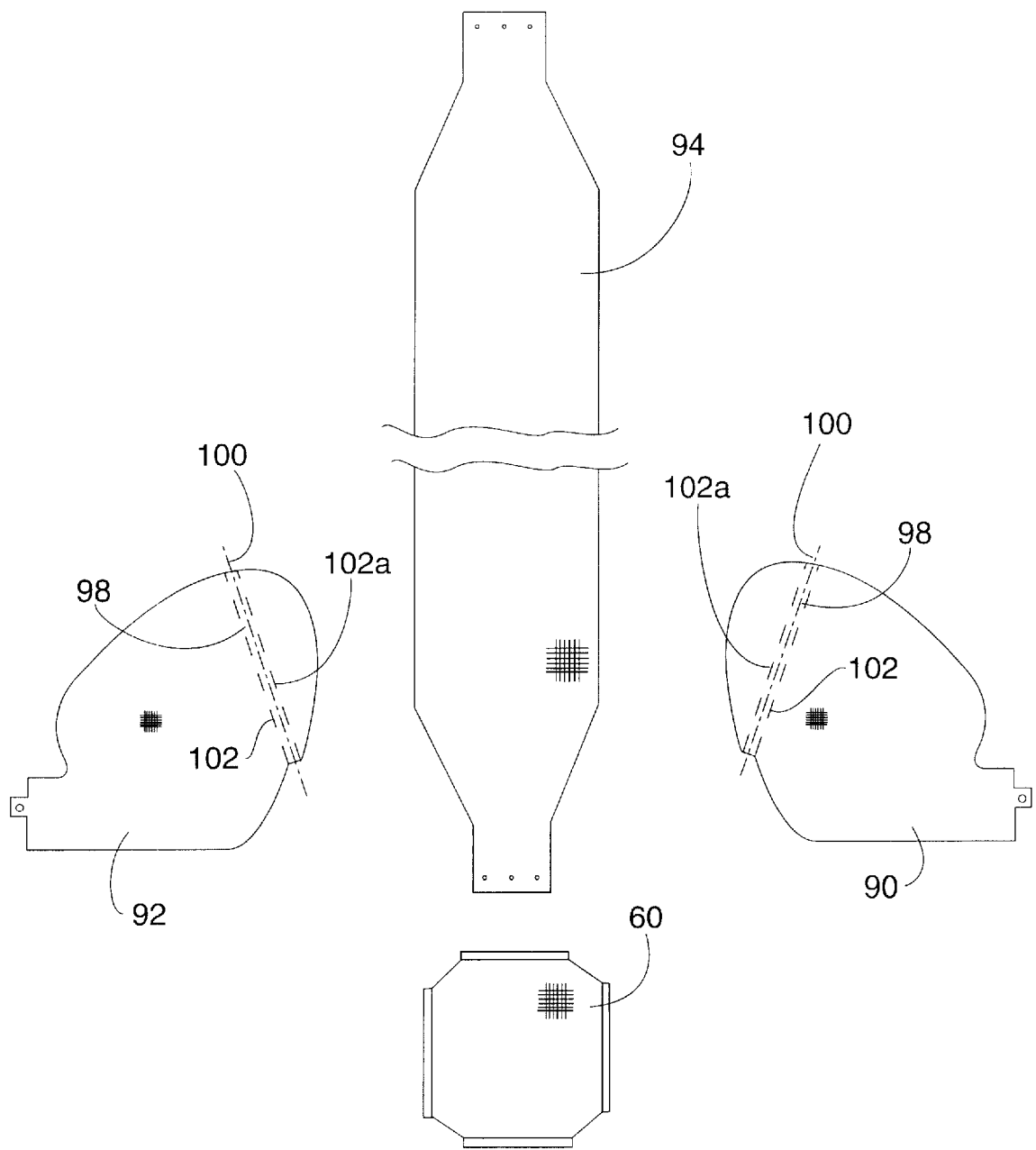
FIG. 3 illustrates the various panels of an air bag of the present invention.

FIG. 3 shows the four major parts of the air bag 50, that is, the two side panels 90 and 92, the main panel 94 and the separator panel 60. Each of the side panels 90 and 92, in this embodiment of the invention and prior to assembly, includes a rectangular extension 98 which is not included in the similarly shaped side panel 20a (or 20b) of air bag 20 (see FIG. 1). In the preferred embodiment of the invention, these rectangular extensions are about 30 millimeters wide but can be larger or smaller to accommodate the manufacturer of the bag. These extensions facilitate the assembly procedure. A fold line 100 is shown, of each side, bisecting the respective extension 98.

Additionally, the inner and outer borders of each extension 98 are designated by numerals 102 and 102a respectively. These borders are used to define the location of a sew line 112 which, as part of the extension, is used to modify the shape of the side panels from that illustrated in FIG. 3.

Figure 4A:
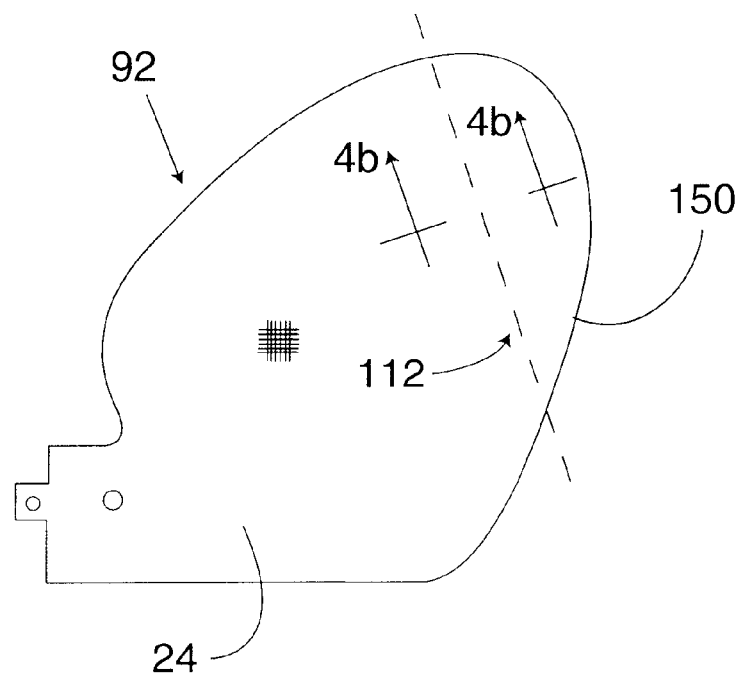
FIGS. 4a and 4b illustrate modifications to the side panels made during assembly.
Figure 4B:
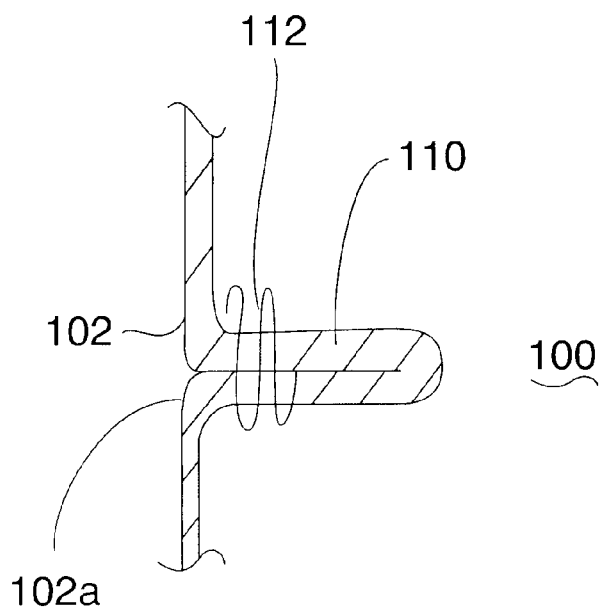

As can be seen in FIGS. 4A and 4B, the purpose of the extension 98 is to define, on an inside surface of each side panel 90 and 92, a pleat or fold generally shown as 110 (shown in FIG. 4B). The pleat 110 is formed by folding the extension 98 about fold line 100 thereby bringing border line (pleat line) 102 and the equally spaced border (pleat) line 102a together as illustrated in FIG. 4B. Thereafter, the panel 90 is sewn across the pleat lines 102 and 102a. The resulting line of stitches or sew line 112 is shown in phantom line (see FIG. 4A). One stitch of the sew line 112 is also illustrated in FIG. 4B. As can be seen, the above construction method eliminates each extension 98 in each side panel 90 or 92, and the resulting side panels now have a smooth, continuous exterior similar in shape to the shape of the side panels 20a, 20b of FIG. 1. As will be seen from the discussion below, the pleat 110 in each of the panels 90 and 92 provides for a simple and effective means for attaching portions of the separator panel 60.

Reference is again briefly made to FIG. 2 and in particular letters A and B which generally show the location of the separator panel 60 in relation to the main panel 94. As can be appreciated, the linear distance from A to B along the main panel 94 is longer than the linear distance along the separator panel 60.

Figure 5:
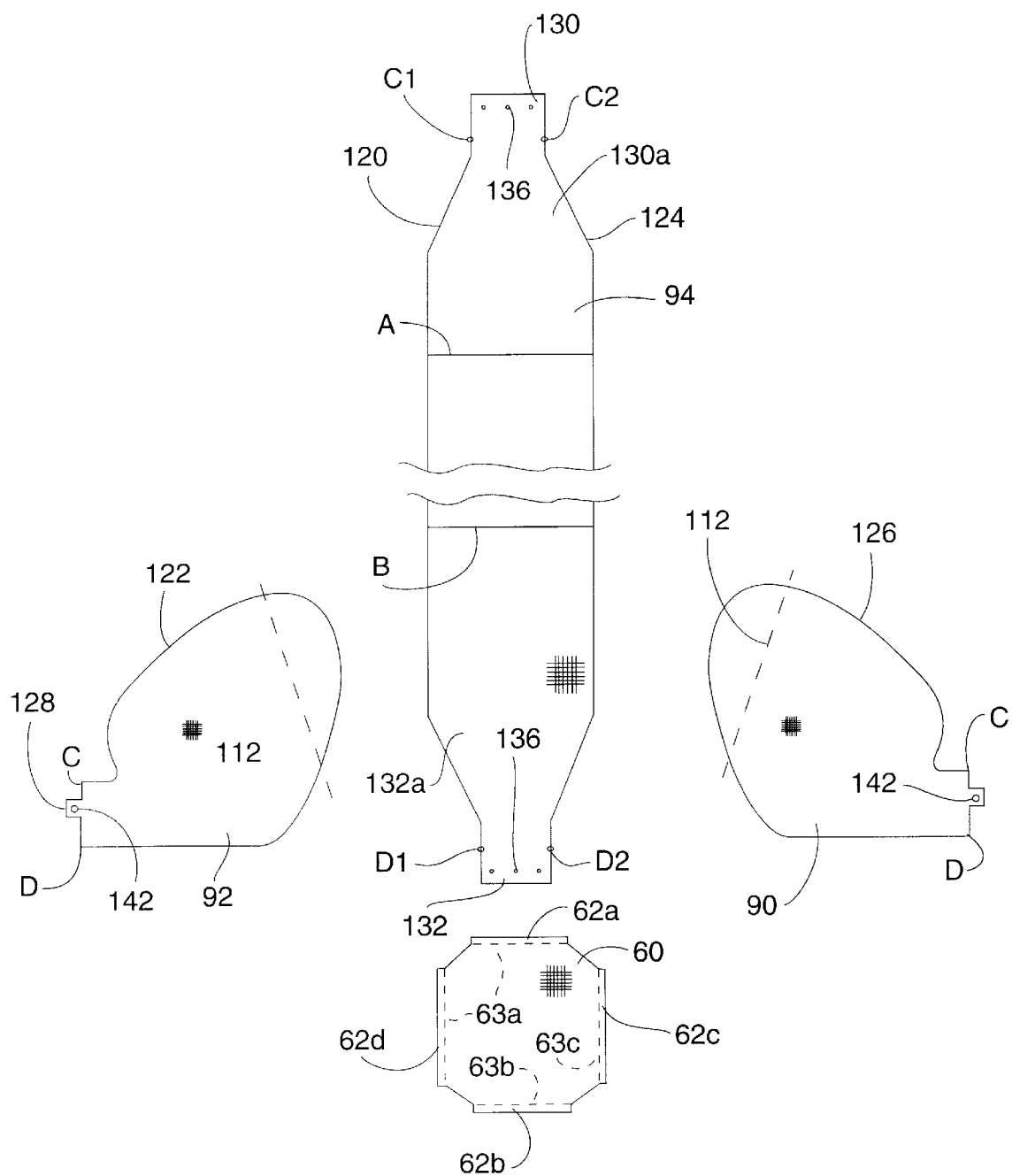
FIG. 5 illustrates modified side panels in relationship to a main panel and separator panel.

Letters A and B are also replicated in FIG. 5 to show the line of attachment of the separator panel 60 to the main panel 94. In the present embodiment, the separator panel 60 is generally square having sides 62a, 62b, 62c and 62d. The corners of the separator panel 60 are removed to provide the truncated shape as illustrated. The separator panel 60 is attached to the main panel 94 by sewing side 62a (at sew line 63a) to the main panel across line A. Similarly, the opposing side 62b (at sew line 63b) is secured to the main panel across line B. This relationship is also shown in FIG. 6. With the separator panel 60 secured to the main panel, the main panel 94 is then secured to the edge of one of the side panels such as 90 along the respective edges. The main panel is then secured about the edge of the other side panel such as 92. In the embodiment shown in FIGS. 3 and 5, the length of the main panel is slightly longer than the perimetal length or distance around each side panel from, for example, point C to point D. This is to provide one mode of attachment of the air bag 50 to a cooperating air bag inflator such as 26 (as further shown in FIG. 9). For example, during sewing of the main panel 94 to side panel 92, point C on side panel 92 is aligned with point C1 on main panel 94 and the edges 120 and 122 of the panels are aligned as well. The panels are sewn together along these respective edges or sides 120 and 122. Thereafter, points C (of panel 90) and C2 (of panel 94) are aligned as are side 124 of the main panel and side 126 of the other side panel 90. The main panel is secured to side panel 90 along these aligned sides or edges 124 and 126. Upon the sewing of the main panel to the side panels, points C1 and C2 of the main panel are, as mentioned above, aligned to points C of each of the side panels and, on completion of the sewing process, points D1 and D2 are respectfully aligned to points D of each of the side panels. The ends 130 and 132 of the main panel extend beyond points C-D of the side panels and define flaps which are used to be placed about the inflator. Each of these flaps includes a plurality (typically two or three) of mounting holes 136. As can also be seen from FIGS. 3 and 5, the main panel 94 includes trapezoidal portions 130a and 132a respectively, which form a portion of a narrowed neck 24 of the air bag 50. Returning briefly to FIG. 5, the neck portions 24 of each of the panels 90 and 92 include a tab or flap 140, each having a mounting opening 142 therein.

Figure 9:
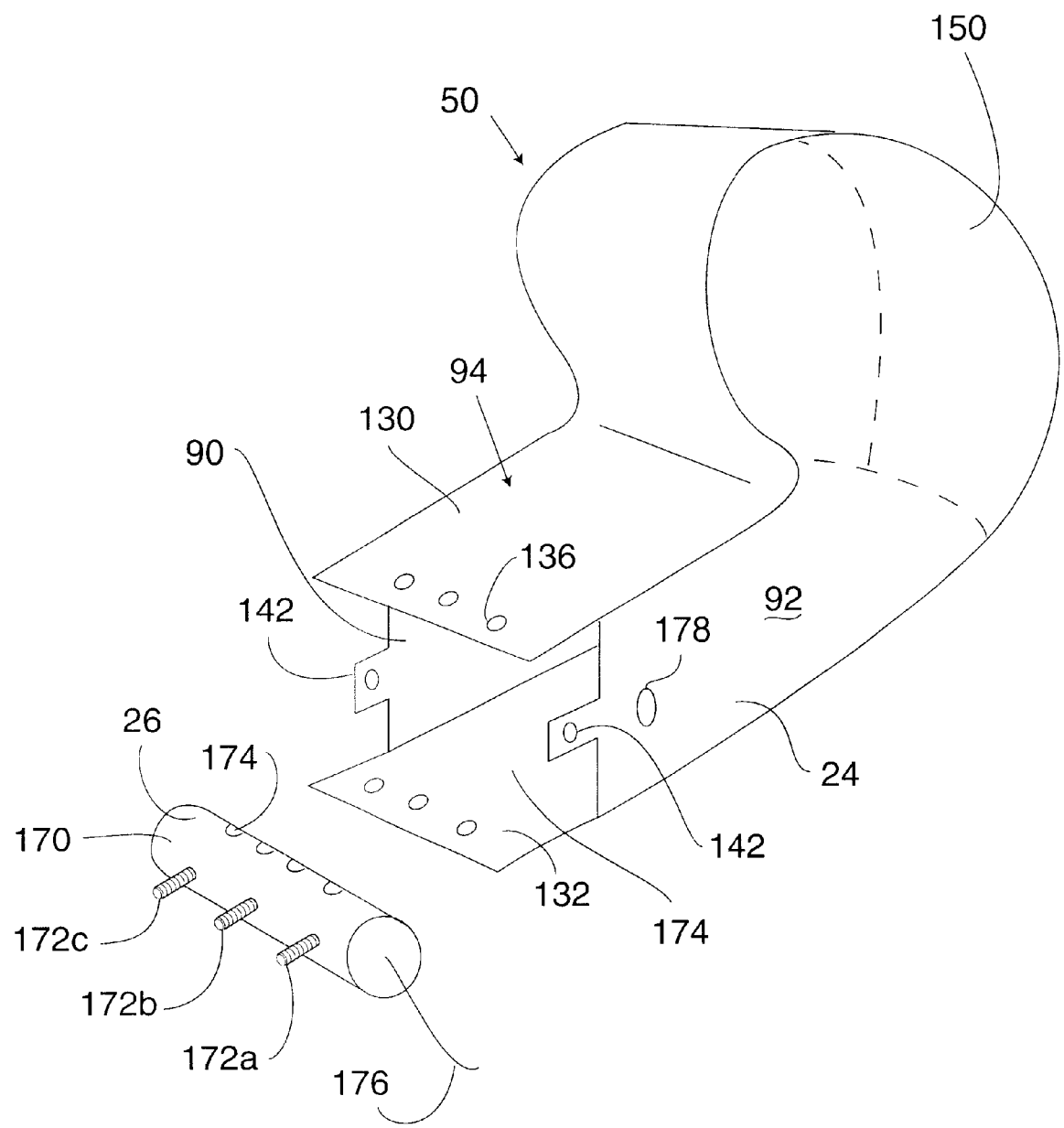
FIG. 9 illustrates a mode of attachment of an inflator to the neck of the air bag.

Returning to the air bag 50 of FIGS. 2 and 5, with the side panels now secured to the main panel, the air bag construction is almost complete. FIG. 7 illustrates a partial front isometric view of the main panel 94 and separator panel 60, as well as portions of each side panel 90 and 92. This figure is an inside-out view as would be seen by the sewing machine operator as the bag is being assembled. The portions of the side panels 90 and 92 that are visible extend from the sewn sides 120 and 124 of the main panel. As noted earlier, the separator panel additionally includes sides 62c and 62d which heretofore have not been connected to any other portion of the air bag. In this view, the top forward portions 150 of each side panel have been tucked between the main panel 94 and separator panel 60 and the respective pleats 110 positioned adjacent the sides 62c and 62d of the separator panel. Thereafter, side 62c of the separator panel 60 is sewn to pleat 110 of panel 90 along sew line 63c. Similarly, side 62d is secured to pleat 110 of panel 92, the sew line being shown by numeral 63d. As can be appreciated from FIG. 7, which as mentioned is a view looking at the inside of the air bag, the corners (of the separator panel 60) generally shown by phantom lines 162 are not secured to either the main panel 94 or the side panels 92 and as such provide a controlled orifice, opening or passage 163 to permit gas to flow from the main or larger cushion chamber 52 to the second or smaller chamber 54 (defined between the separator panel 60 and main panel 94). As can be appreciated the separator panel can be rectangularly shaped with actual corners secured to the adjacent portion of the air bag. In this embodiment the panel 60 can include openings such as 163' through which inflation gas migrates from the primary chamber to the secondary chamber. The dotted lines 63a and 63b illustrate the sewn seams, respectively connecting sides 62a and 62b (mentioned above) to the main panel 94. Subsequently, the air bag is pulled through the assembled neck 24 so that the various above-mentioned seams now reside on the interior of the air bag. The resulting configuration is shown in FIG. 9. As can be appreciated one benefit of this embodiment of the invention is that each sew line is simple to achieve.

Figure 10A:
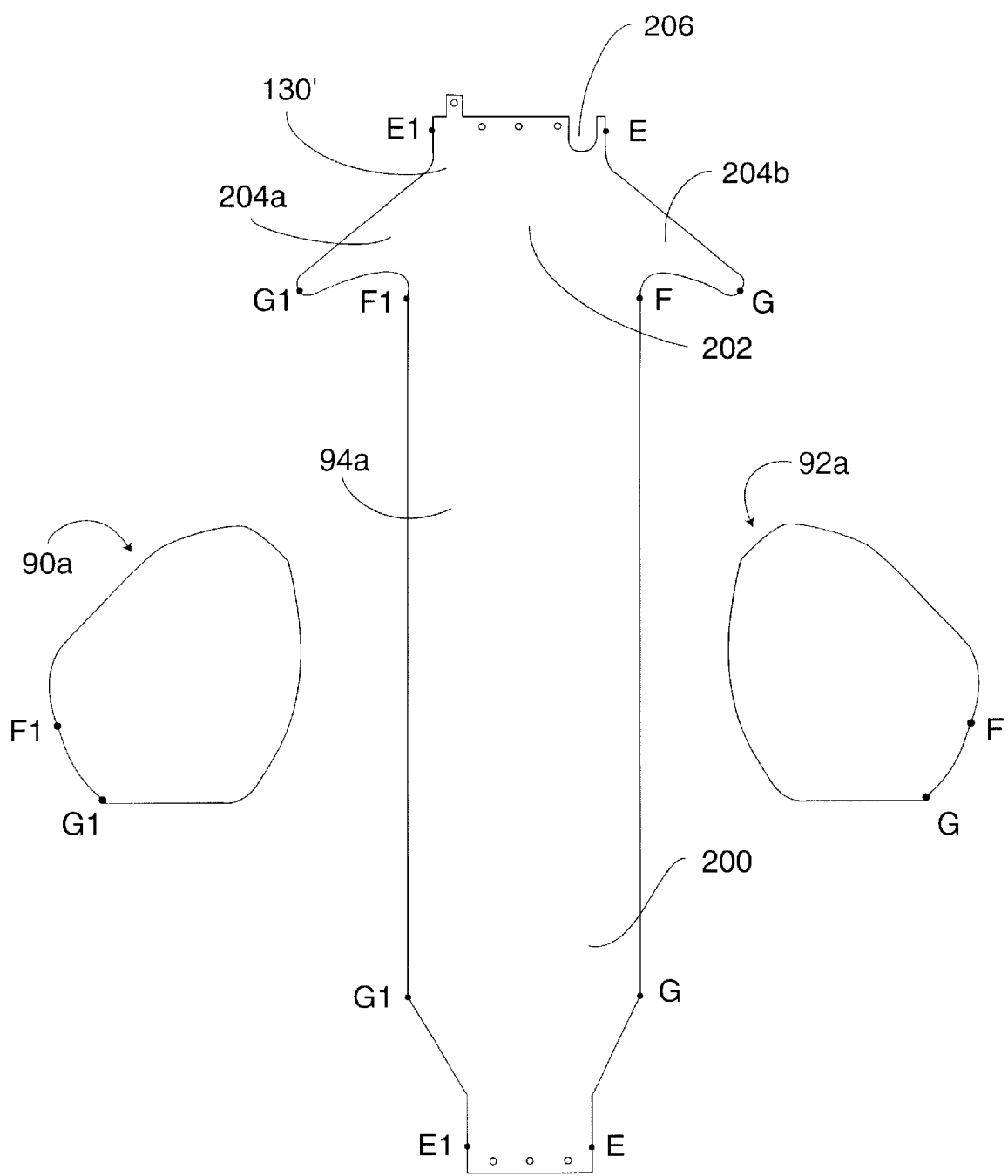
FIGS. 10a and 10b show an alternate embodiment of the invention.
Figure 10B:
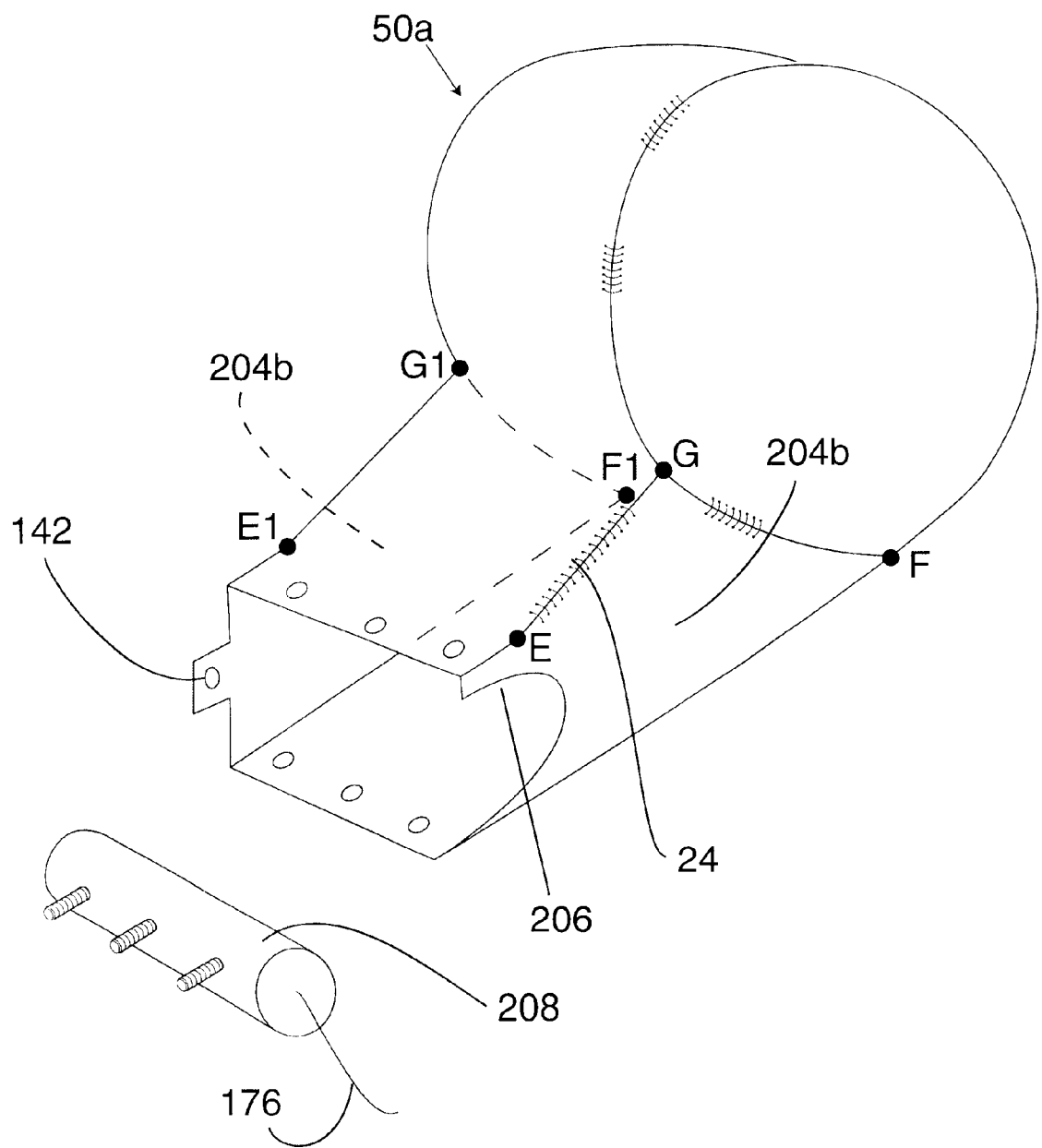
Figure 15A:
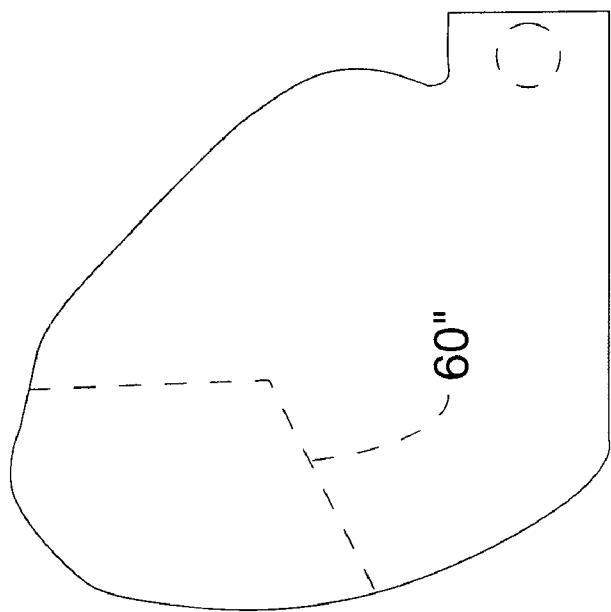
FIGS. 15 and 15a show alternate arrangements of a separator panel.
Figure 15:
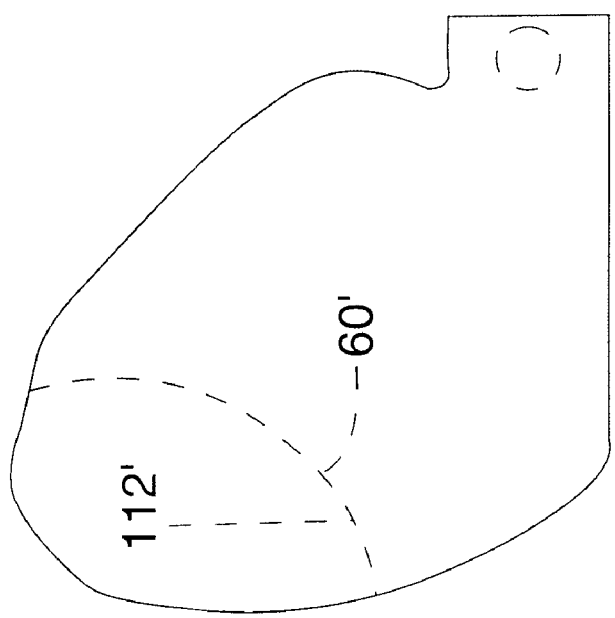

Other configurations of side panels and main panels can be utilized without changing the essence of the invention. For example, the sides of the neck of the air bag may be formed from material in the main panel as shown in FIGS. 10A and 10B. In this embodiment, the side panels 90a and 92a are generally oval in shape. The lower portion 200 of the main panel 94a is similar in shape to that of main panel 94 (of FIG. 5), however, the upper portion 202 has outwardly extending flaps 204a and 204b which, when sewn to the respective side panels, form a portion of the neck 24 of the air bag 50a as shown in FIG. 10B. The flap 130' formed in the top portion of the main panel 94a also functions to overlap a portion of the inflator. The flap 130' also provides a side opening 206 in the side of the neck of the air bag 50a that envelops the wall 208 of the inflator, proximate the end of the inflator. The opening 206 also permits easy access to the wire 176 of the inflator. The width of the generally rectangular middle portion of the center panel 94 or 94a can be increased to easily change the volume of the bag or can be of other shapes to change the volume of the air bag. Also the separator panel 60 may be sewn into the air bag along a curved, or compound seam as shown in FIGS. 15 and 15a rather than the straight seam (when the air bag is viewed from the side) as shown in FIGS. 2 and 5. The main and side panels, in any embodiment of the invention, may be formed from a single panel of fabric or a number of co-joined pieces. Additionally, the side panels and main panel of bags 50 and 50' may be made from a single piece of fabric assembled to form analogous side panel and main panel regions. The neck region of the air bag may be a single thickness of material or reinforced (not shown) to provide heat shielding from the heated inflation gas. FIG. 10A shows various letters E–G and E'–G' on the main and side panels. The points of the material corresponding to these letters are aligned and the bag is sewn together to achieve the general shape shown in FIG. 10B.

FIG. 8 is a partial cross-sectional view and illustrates the connection of one side of the separator panel 60 to the pleat 110 formed in panel 92. The connection of the other side of the separator panel 60 to the other pleat 110 formed in panel 90 is the same.

Reference is again briefly made to FIG. 9 which shows an isometric view of the neck portion of the air bag 50 as well as flaps 130 and 132 on the main panel and flaps 142 on each of the side panels 90 and 92. Additionally, there is shown a cylindrically shaped air bag inflator, of known construction, which contains a quantity of propellant. The body 170 of the inflator includes a plurality of exit ports through which the inflation gas enters the neck of the air bag. While not particularly pertinent to the present invention, the inflator includes three studs 172a–c. The reason the studs 172 have no particular importance, in the present invention, is that the neck 24 of the air bag can be attached to the inflator or to an associated reaction can or housing in many different ways. As illustrated, the air bag 50 is designed to fit about the inflator 26. More particularly, the inflator 26 is positioned within the opening 174 of the air bag. Subsequently, tabs 142 of the side panels are bent over and secured about studs 172a and 172c respectively. Thereafter, flap 130 and in particular its mounting holes 136 are fitted about the three studs 172a–172c. Subsequently, the lower flap 132 is bent upwardly and also fitted about the studs 172a–172c. The flaps 130 and 132 may be secured to the inflator by a plurality of nuts which are not shown, or alternatively, the inflator, with the air bag secured thereto, is inserted through openings within the housing and the studs secure the inflator and air bag to the housing. Typically, the inflator 26 will also include one or more electric wires such as 176 which communicate a firing signal to the inflator. One of the side panels such as 90 or 92 may include a small opening 178 through which the wires may extend. Various other known methods of attaching an inflator to an air bag or housing can be used within the present invention.

Reference is again made to FIG. 15. The separator panel 60' is sewn to the side panels along an arcuate sew seam 112'. As mentioned earlier, the preferred ratio of the volume of the primary chamber to the secondary chamber is in the range of about 1.5:1 to about 5.6:1. In some situations it might be desirable to reduce this ratio closer toward 1:1. It should be recalled that the air bag 50 (or 50') is sized so that as the primary chamber 52 inflates, one portion of the exterior of the primary chamber will react against the windshield while another portion of the air bag will react with the lower torso of the seated adult occupant. As the location of the separator panel 60, secured along a straight sew line, is moved within the air bag to vary the ratio of the sizes (volume) of the two chambers 52 and 54, it might not be possible to simultaneously achieve the desired sized while also achieving the desired interactions of the primary chamber with the occupant and windshield. The separator panel 60' of FIG. 15 provides for greater latitude in being able to choose and locate the relative size and shape of the two chambers while still permitting a lower forward portion of the air bag to be available to react with the lower torso of the adult occupant and still provide an upper rear portion of the primary chamber to be available to react against the windshield. The arrangement of FIG. 15a shows a variation of FIG. 15 in that a separator panel 60" can be sewn to the side panels along a compound linear seam which provides the above benefits along with the ability of ease of sewing, that is, along two straight seam segments.

In operation, at least one or various crash sensors (not shown) located on the vehicle sense a crash and provide a signal to a crash control module which generates a control signal to the inflator. The inflator generates inflation gas at the rate described below. The inflation gas initially inflates the lower or primary chamber 52 at a lower defined inflation rate, expanding same to react against the occupant and a portion of the vehicle such as the windshield or instrument panel thereby providing protective support to the lower torso of the occupant. As the primary chamber 52 continues to inflate and the accident proceeds, a portion of the inflation gas is communicated to the secondary chamber 52 through or across the separator panel 60 (through openings 163, see FIG. 7) to begin to inflate the secondary chamber, in a delayed manner relative to the inflation of the primary chamber. As the secondary chamber inflates it provides a protective cushion for the adult occupant's upper chest and head. Additionally, by limiting the rate of inflation to a relatively slow rate, the impact forces of the bag with an out-of-position occupant, such as the small child, are reduced.

The output or performance of an air bag inflator such as inflator 26, is typically determined or characterized by deploying the inflator within a closed test tank and measuring the pressure rise in the tank. These test tanks generally have a volume of either 60 or 100 liters for frontal air bag systems and are well known and well used in the industry. The peak pressure (or alternatively the pressure achieved within a predetermined time period, or the rate of pressure generation) reached in the tank test is a measure of the inflator's performance capacity.

It is generally known that the speed of the deployment of an air bag can affect the level of injurious forces applied to out-of-position occupants, that is, the higher the deployment speed, the greater the force applied to the occupant in close proximity to the location of the non-deployed air bag. Furthermore, the speed of air bag deployment is closely linked to the fill rate of the inflator and the pressure that can be sustained by the inflation gas generated by the inflator. However, one cannot simply slow down the rate of pressure generation of inflator flow to lessen injuries to out-of-position occupants and still protect large size occupants in severe crashes. However, such changes in cooperation with the present air bag provide surprising results.

FIG. 11, graph 210, shows a pressure-time curve for a typical single level air bag inflator tested within a tank of about 100 liters. This curve is representative of many prior art inflators. Graph 212 shows a pressure-time curve for a preferred inflator that provides a slower pressure increase.

The preferred inflator 26 (see graph 212, FIG. 11) for use in the chambered air bag 50 system generates pressure significantly slower (i.e. provides inflation gas at a lower rate to the air bag) compared to the rate of pressure increase or generation of the inflator characterized by graph 210, FIG. 11. For example, the above inflator when tested at room temperature conditions in a closed 100-liter tank achieved a pressure of about 58 kpa at 30 msec into the test and about 125 kpa at 40 msec. As shown below, an inflator with the above performance in combination with a multi-chambered air bag having a primary chamber of about 95 liters and a second chamber of about 25 liters provided excellent system performance. As can be appreciated, the preferred performance characteristics of the inflator will depend on the size of the air bag and on the size of each chamber. However, it is believed that an inflator that generates a pressure increase measured at 30 msec of between 50 kpa and 100 kpa will provide good accident performance. Having defined a preferred pressure curve, this curve may be generated using a variety of inflators all within the scope of one skilled in the art. For example, the pressure curve can be achieved by controlling the amount and type of propellant used, the physical characteristics of the propellant (powder or pellets) as well as the number and location of exit ports communicated to the air bag used as well as vent ports used to communicate a portion of the inflation gas to the atmosphere rather than to the air bag. Further, the pressure curve can easily be achieved using gas inflators with pressure regulating valves or inflators with electrically controllably servo-valves.

As a rule of thumb in the safety restraint industry, it is often said that an air bag fills in about 30 msec. This rule of thumb is an estimation of the time needed to fill an air bag during a severe crash before an occupant moves into the inflating air bag. In the present invention, the inflation rate is purposely slowed such that the inflator has produced no more than about 50% of its inflation gas capability by 30 msec. Alternatively, the slowed inflator can be characterized in such a way that it has produced 90–95% of its total output (measured at 100 msec) by 80 msec after it is activated. The 90–95% amount is generally used in air bag design to describe an essentially full bag 30 (rather than using a 100% amount because the time at which a typical inflator produces 90–95% of its output tends to be more consistent). As mentioned above, an inflator 26 with the characteristics of graph 212, FIG. 11, was used to inflate a segmented air bag having a primary chamber of 95 liters and a secondary chamber of 25 liters. The bag was essentially identical to that shown in FIG. 5. The bag differed modestly from that of FIG. 5 as the bag also included some added pieces of material positioned about the neck of the bag near the location of the inflator, such added pieces functioning as a heat shield. To illustrate the surprising benefit of the present invention, various tests were conducted to enable a comparison of the performance of a conventional air bag and inflator (which generated a pressure curve of graph 210, FIG. 11) with the combination of air bag and inflator of the present invention. Selected, comparison test data for two tests are presented below to illustrate the unique capabilities of the invention.

The first test condition represents an unbelted average sized male who is normally seated in a vehicle which is involved in a collision with a rigid barrier at 30 mph. An average sized male dummy (or 50$^{th}$ percentile Anthropomorphic Test Device) is seated in the vehicle with the seat in a mid track position. The vehicle is then crashed into a rigid barrier at 30 mph or, alternatively, the test, corresponding to the data below, is simulated as a sled test where the vehicle's cabin structure is mounted on a sliding track which is then subjected to the same acceleration pattern as the vehicle would be subjected to in an actual crash test. During the test, various sensor readings from a test dummy are recorded from which various injury criteria are derived. This type of test procedure is well known in the art.

Figure 12:
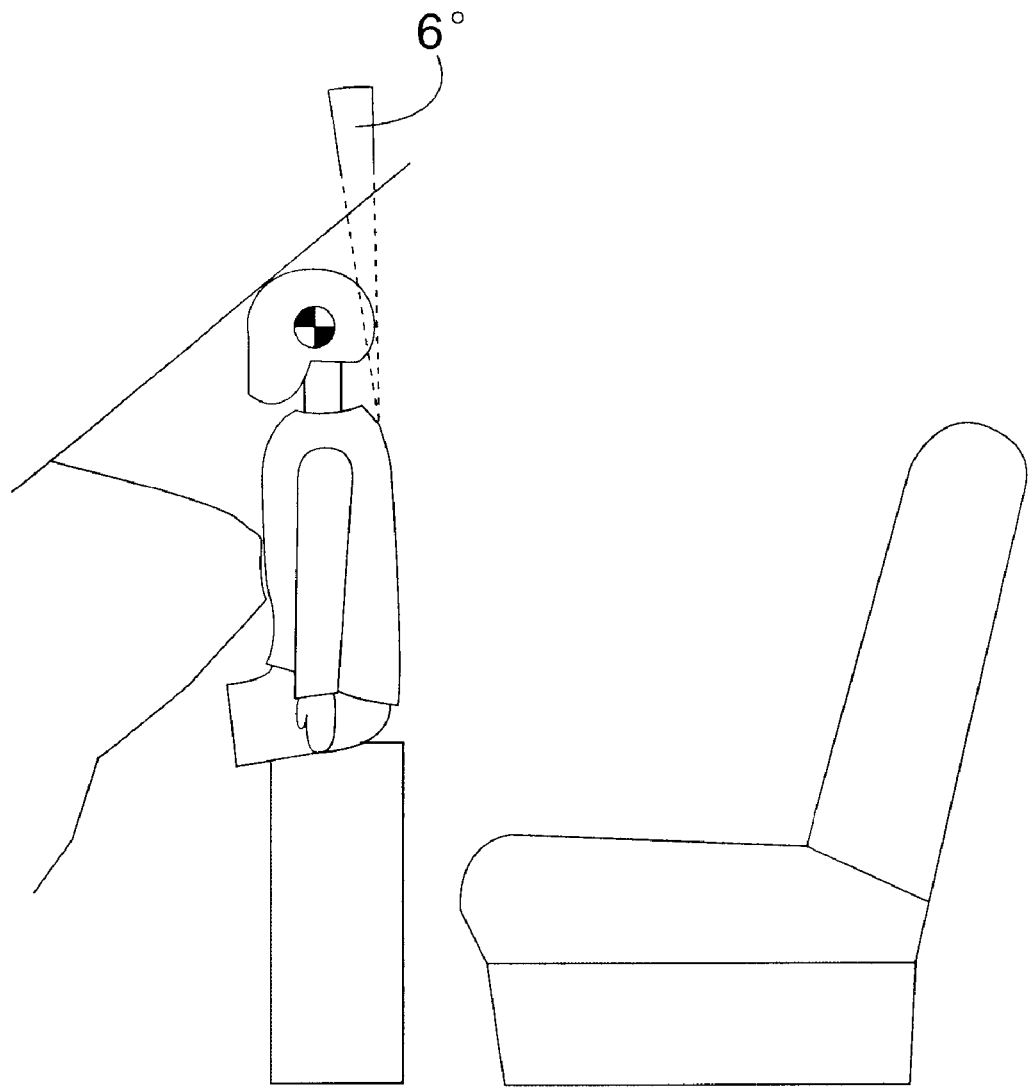
FIG. 12 shows a test configuration for an out-of-position child.

This test assesses the air bag's ability to perform in its intended environment, that is, its capability to provide restraint. The second test condition simulates a crash condition in which an average 6-year-old child 30' is in direct contact with the air bag door 57 at the time of deployment. This test can be viewed as approximating the situation where the vehicle were first decelerated such as by being braked suddenly prior to the collision. This second test is one of two so-called out-of-position tests involving the 6-year-old child/dummy as found in the above mentioned proposed Rules. The placement of the surrogate test device (that is the child dummy) is shown in FIG. 12. The dummy's legs are removed as per direction from the proposed Rules, and the chest of the dummy is placed in direct contact with the air bag door such that the front surface of the dummy's chest, at the chest's center of gravity, is in contact with the air bag door. In cases where the contour of the vehicle instrument panel precludes such contact, then the dummy is placed as close as the contour will allow, however, data on this variation is not presented here. In this second test, the vehicle (or test buck or sled) is not accelerated as was the case with the first test conditions, but the air bag is simply deployed, and various sensor readings are recorded from which various injury criteria are derived.

FIGS. 13 and 14 illustrate various injury criteria for the first and second tests respectively. In each FIG. 13 and 14, comparative data for the HIC and Chest Acceleration injury criteria is presented for tests using an inflator having a performance defined by the inflation curve 210 and a single-chamber passenger air bag (this data is shown in the left hand bar of these figures) and the above multi-chambered air bag 50 with an inflator that can be characterized by graph 212 above (this data is shown in the right-hand bar in these figures). The air bags, in all tests, were similarly shaped generally conforming to the bags shown in FIGS. 1 and 5 and the total volume of the air bag was about 120 liters. The data presented in FIGS. 13 and 14 is as a percent of ICPL.

The term ICPL is used by the US Government National Highway Transportation Safety Administration as an acronym for "Injury Criteria Performance Limit" and refers to a proposed limit value for various designated injury criteria.

As can be seen, the present invention provides a remarkable improvement in performance in relation to the out-of-position 6-year-old while proving acceptable performance for the 50$^{th}$ percentile adult.

Table 1 lists the ICPL values for certain injury criteria including those shown in FIGS. 13 and 14. Table 2 shows additional comparative test data for the 6-year-old test.

TABLE 1

| | FIG. 13 50th Percentile Adult | | | FIG. 14 6 Year Old | | |
|---|---|---|---|---|---|---|
| | 100% ICPL Value | Prior Art Configuration | Present Invention | 100% ICPL Value | Prior Art Configuration | Present Invention |
| HIC (36 msec) | 1000 | 440 | 945 | 1000 | 840 | 12.4 |
| Chest Acceleration | 60 g | 45 g | 51 g | 60 g | 80.8 g | 23.2 g |

TABLE 2

| 6 Year Old Test | | | |
|---|---|---|---|
| | 100% ICPL Value | | |
| Deflection | 47 mm | 45 mm | 47 mm |
| CTI | 1.0 | 1.70 | 1.06 |
| Neck Shear Aft | 1400 N | 405 N | 126 N |
| Neck Shear Fwd | 1400 N | 2473 N | 253 N |
| Neck Tension | 1490 N | 5540 N | 807 N |
| Neck Compression | 1800 N | 1580 N | 56 N |
| Neck Flexion | 57 N-m | 15.2 N-m | 20.3 N-m |
| Neck Extension | 17 N-m | 124.4 N-m | 10 N-m |
| Nij | 1.0 | 3.5 | 0.389 |

Many changes and modifications in the above-described embodiment of the invention can, of course, be carried out without departing from the scope thereof. Accordingly, that scope is intended to be limited only by the scope of the appended claims.

What is claimed is:

1. An air bag system for protecting an occupant comprising:
   a multi-chambered air bag comprising a main panel, a pair of side panels and a separator panel, said air bag being initially stored in a compact configuration in facing orientation to the occupant to be protected, when inflated a first or main chamber of the air bag extends forward, toward the occupant, of its initially stored location and a second chamber is positioned generally facing the occupant, the first and second chambers separated by a flat separator panel, said separator panel defining two generally straight sides, each side being coupled to the main panel, wherein opposite sides of the separator panel are secured to each of the respective side panels the second chamber located to interfere with the upper chest and head of the occupant, the inflated air bag presenting a face part facing the occupant and a top part extending away from the face part and the occupant, the separator panel extending on a bias from an upper portion of the face part to a rearward portion of the top part.

2. The system as defined in claim 1 wherein the ratio of the volume of the main chamber to the second chamber is in the range of 1.5:1 to 5.6:1.

3. The system as defined in claim 1 wherein the ratio of the volume of the second chamber to the main chamber is about 25:95.

4. The system as defined in claim 1 wherein each side panel includes an inwardly extending pleat, each pleat arranged on a bias in relation to the occupant to be protected.

5. The system as defined in claim 4 wherein opposite sides of the separator panel are secured to the pleat of each respective side panel.

6. The system as defined in claim 4 wherein other sides of the separator panel are connected to the main panel.

7. The system as defined in claim 4 wherein flow orifices are provided between the separator panel and points of attachment of the separator panel to the main panel and to each of the side panels.

8. The system as defined in claim 7 wherein the orifices are formed at corners of the separator panel.

9. The system as defined in claim 1 including an inflator capable of filling a 100-liter test tank to a pressure of no more than 100 kpa within 30 msec.

10. The system as defined in claim 1 wherein the occupant is simulated by a 6-year-old biofidelic dummy initially positioned with approximately a zero mm spacing relative to a deployment cover of the air bag and upon activation of the inflator and deployment of the air bag the accident criteria as measured by HIC forces imparted to the dummy are less than 100 and the Chest Acceleration imparted to the dummy are less than 30 g.

11. The system as defined in claim 10 wherein measured accident criteria obtained includes: occupant neck shear of about 200 N, occupant neck tension of about 1000 N-m, and occupant neck flexion of about 20.3 N-m.

12. A partitioned air bag comprising a main panel, a pair of side panels, a separator panel having opposite sides which are secured to each of the respective side panels, an upper and a lower inflatable chamber, the lower chamber upon inflation is positioned to provide a cushioned boundary generally against the lower chest and abdomen of an occupant to be protected, the lower chamber first receiving inflation gas from a source of inflation wherein the inflation gas is sequentially transferred to the upper chamber through one or more ports formed by the separator panel that separates the air bag into the upper and lower chambers.

13. A combination including the air bag as defined in claim 12 and further including an air bag inflator, the inflator characterized as follows:
the inflator when tested in a test tank achieves about 95% of its maximum pressure output at about 80 or more msec after firing.

14. A combination including the air bag as defined in claim 12 and further including an air bag inflator, the inflator characterized as follows:
the inflator when tested in a 100-liter test tank achieves about not more than 60% of its maximum output at 30 msec.

15. The system as defined in claim 12 further including an air bag inflator, wherein the inflator when tested in a 100-liter test tank achieves one of about not more than 60% of its maximum output at 30 msec.

16. An air bag system for protecting an occupant comprising:
a multi-chambered air bag (50) initially stored in a compact configuration in facing orientation to the occupant to be protected, when inflated a first or main chamber of the air bag extends forward, toward the occupant, of its initially stored location and a second chamber is positioned generally facing the occupant, the first and second chambers separated by a generally rectangular separator panel, the second chamber located to interfere with the upper chest and head of the occupant, the inflated air bag presenting a face part facing the occupant and a top part extending away from the face part and the occupant, the separator panel extending on a severe angle or bias from an upper portion of the face part to a rearward portion of the top part, wherein a top of the separator panel is secured to the rearward portion of the top part, a bottom of the separator panel is secured to the face panel and wherein sides of the separator panel are secured to adjacent portions of the air bag to affect the first and second chambers.

* * * * *